United States Patent [19]

Hiramatsu et al.

[11] Patent Number: 5,132,099

[45] Date of Patent: Jul. 21, 1992

[54] METHOD FOR PRODUCING HYDROGEN PEROXIDE

[75] Inventors: Yasushi Hiramatsu, Tokyo; Yukio Ishiuchi, Ushiku; Hiromitsu Nagashima, Matsudo, all of Japan

[73] Assignee: Mitsubishi Gas Chemical Company, Inc., Tokyo, Japan

[21] Appl. No.: 763,166

[22] Filed: Sep. 20, 1991

[30] Foreign Application Priority Data

Dec. 27, 1990 [JP] Japan .................................. 2-415080

[51] Int. Cl.⁵ .............................................. C01B 15/01
[52] U.S. Cl. .................................................. 423/584
[58] Field of Search ........................................ 423/584

[56] References Cited

U.S. PATENT DOCUMENTS 4,772,458  9/1988  Gosser et al. ................... 423/584

FOREIGN PATENT DOCUMENTS 600054  6/1960  Canada .............................. 423/584

Primary Examiner—Wayne Langel
Attorney, Agent, or Firm—Wenderoth, Lind & Ponack

[57] ABSTRACT

A method for producing hydrogen peroxide by the reaction of hydrogen and oxygen in the reaction medium in the presence of a platinum group metal catalyst supported on a halogenated resin, in which, since there are no halogen ion nor high concentrations of acid in the reaction medium of this invention as there are in prior art methods, the problems of dissolution of catalyst and corrosion of the reaction vessel are solved.

11 Claims, No Drawings

METHOD FOR PRODUCING HYDROGEN PEROXIDE

FIELD OF INDUSTRIAL UTILIZATION

This invention relates to an improvement in the method for making hydrogen peroxide by reacting hydrogen and oxygen directly in the presence of a catalyst in the reaction medium. More particularly, it relates to using halogenated resin as the catalyst carrier.

DESCRIPTION OF THE PRIOR ART

Heretofore, the main industrial production method for hydrogen peroxide has been the autooxidation method using alkyl-anthraquinone as a medium. The problems associated with this method include the complexity of the overall process of reduction, oxidation, extraction, purification and concentration. As a consequence of these problems, the process involves high equipment and operation costs. There is also a problem of loss due to such causes as the degradation of alkyl-anthraquinone and the degradation of the hydrogenation catalyst.

Various methods which attempt to overcome the problems described above have been tested. For instance, Japanese Patent Publication No. 47121/1981, Japanese Patent Publication No. 18646/1980, Japanese Patent Publication No. 23401/1989 and Japanese Laid Open Patent Application No. 156005/1988 describe methods for producing hydrogen peroxide by the direct reaction of hydrogen and oxygen in an aqueous reaction medium in which a platinum group metal is used as the catalyst and describe the production of a high concentration of hydrogen peroxide. In these methods, aqueous solutions of acids and inorganic salts are used as the reaction medium. Additionally, a halogen ion is added to the reaction medium to inhibit catalytic activity and thereby prevent the decomposition of the hydrogen peroxide produced. Japanese Laid Open Patent Application No. 156005/1988 describes a method in which platinum group catalysts are used and hydrogen peroxide is produced from hydrogen and oxygen under raised pressure in an acidic aqueous solution, and in which it is possible to produce hydrogen peroxide selectively in high concentration introducing such halogen ions as bromine ions into the aqueous solution. Moreover, Japanese Laid Open Patent Application Nos. 258,610/1990 and 133909/1989 describe a method for producing hydrogen peroxide in high concentration in an aqueous solution containing a strong acid such as hydrochloric acid or sulphuric acid and using a platinum group catalyst supported on a hydrophobic carrier.

In the prior art, from a practical standpoint, it has been necessary for the reaction medium to contain a high concentration of acid or acid and halogen ion in combination in order to obtain a high concentration of hydrogen peroxide in methods for reacting hydrogen and oxygen directly in the reaction medium to produce hydrogen peroxide.

In these methods, the problem of the dissolution into the reaction medium of the catalyst before and after the reaction and of the reaction vessel structural materials during the reaction has been observed. Particularly, in the presence of the aforementioned halogen ions, the degree of dissolution of the catalyst and reaction vessel materials increases relative to the concentration of the halogen ion. This is a very significant problem for the life of the catalyst where the catalyst is used continuously for long periods of time, and moreover, a corrosion resistant reaction vessel made of very expensive materials is required.

Additionally, there are also considerable costs associated with the necessity of neutralization and ion removal post treatment to remove the high concentration of acid and the halogen ion respectively from the hydrogen peroxide obtained after the reaction depending upon the use to which it will be put.

PROBLEMS THIS INVENTION AIMS TO SOLVE

The inventors of this invention have, as the result of continuing investigations, discovered a method which, by using a catalyst in which a platinum group catalyst is supported on a resin carrier containing a halogen, accomplishes the objective of producing hydrogen peroxide in high concentration directly from hydrogen and oxygen, either in the presence or absence of a non-reactive gas such as nitrogen, in a reaction medium which does not contain a high concentration of acid or halogen ion.

One object of this invention is to provide such a method for producing hydrogen peroxide in high concentration by reacting hydrogen and oxygen directly in the presence of a platinum group catalyst in the presence or absence of an non-reactive gas such as nitrogen, using water or an aqueous solution including only a very small amount of an additive such as a hydrogen peroxide stabilizer as the reaction medium.

Another object of this invention is to provide an effective method for producing hydrogen peroxide directly from hydrogen and oxygen in which it is possible to conduct industrial operations for practical and economical production on a large scale and in which such problems as chemical corrosion and dissolution of the metallic catalyst and the reaction vessel structural materials are overcome.

A further object of this invention is the simplification of the production method by reducing or eliminating neutralization and ion extraction steps.

MEANS FOR SOLVING THE PROBLEMS

In this invention, the halogenated resin used as the catalyst carrier is a resin containing a halogen which is in a form chemically bonded to the resin. In this invention, it is possible to use as the catalyst carrier a resin halogenated by reagents normally used for halogenation, a resin obtained from the homopolymerization of a halogenated monomer or a resin obtained from the copolymerization reaction of a halogenated monomer with another reactive monomer or polymer. Moreover, the resin in this invention may contain an inorganic component, and the same effectiveness can be achieved by using as the carrier either a normal inorganic carrier whose surface has been coated directly with a halogenated resin or a resin coated inorganic carrier in which the resin coating is applied and then halogenated using reagents normally used for halogenation. Although all other halogenated resins may be used, fluorinated resins which contain no halogen other than fluorine are not used in this invention since their hydrogen selectivity is very low. Among the preferred resins used as catalyst carriers in this invention are halogenated adsorbing resins and halogenated ion exchange resins. The halogenated adsorbing resins of this invention include halogenated styrene-divinylbenzene copolymers and halogenated polymers or copolymers of acrylates, methacrylates or vinylpyridine etc., all of which adsorb various organic substances by means of Van der Waals forces, have a large specific surface area, do not have such functional groups as ion exchange radicals, and are insoluble crosslinked polymers exhibiting microporous structure.

The halogenated ion exchange resins used as catalyst carriers in this invention include synthetic resins having chemical structures introducing sulfonic acid type or quaternary ammonium type functional groups to crosslinked polymers. Styrene-divinylbenzene copolymers, acrylate polymers and methacrylate polymers having ion exchange radicals can be used for the preparation of the halogenated ion exchange resin of this invention.

Brominated styrene-divinylbenzene copolymers are preferred adsorbing resins for use as the catalyst carrier in this invention, and brominated styrene-divinylbenzene copolymers having sulfonic acid groups which function as ion exchange radicals are also preferred.

With regard to the method of halogenating the resin, the prior art (For example, Japanese Laid Open Patent Application No. 89311/1984 and Japanese Laid Open Patent Application No. 89312/1984) can be used. The catalysts which can be used in this invention are the platinum group metals. Specifically, ruthenium, osmium, rhodium, iridium, palladium, and platinum may be used either singly or in combination as mixtures or alloys. Preferably, palladium or platinum is used as the catalyst.

The form of the catalyst carrier of this invention may be selected from a fine powder, grains, or pellets. The general characteristics of the carrier, although not restricted, are preferably that the surface area be large and that it be able to support the metal catalyst in a highly dispersed fashion. Either a halogenated, crosslinked synthetic resin which has a large surface area due to microporosity or an inorganic carrier with a large surface area which has a thin halogenated resin coating is appropriate. Moreover, in order for the carrier to be usable in an aqueous solution, it is desirable that it does not float under reaction conditions and that it can be wetted by an aqueous solution. It is preferable that the resin carrier is hydrophillic as a whole although it may be partially hydrophobic. However, if the resin carrier has strongly hydrophobic characteristics, it is preferable that it be treated to make it hydrophillic. To make the resin more hydrophillic, in addition to chemically introducing hydrophillic ion exchange radicals to the resin, the surface of the resin can also be wetted with an organic solvent which is miscible with water, and afterward, water may be substituted for the solvent. In practice, aromatic adsorbing resins (microporous resins) can be used as hydrophillic carriers after wetting the insides of the micropores with methanol, ethanol, or acetone and then substituting these solvents with water. This process of making the resin carrier hydrophillic using water and hydrophillic organic solvents is ordinarily conducted after the metallic catalyst has been supported on the carrier. Additionally, it is possible to use even a strongly hydrophobic carrier as a hydrophillic carrier by adding a very small quantity of a surface active agent to the reaction medium although this does not constitute surface treatment of the carrier resin.

Various resins, including commercially available resins, can be used as the halogen containing resin carrier of this invention. Preferable examples of such resins include brominated resins. Such brominated resins are commercially available from Mitsubishi Kasei Corporation under the trade names "SP200" for their aromatic modified adsorbing resin and "RCP145H" for their heat resisting, highly acidic and highly porous ion exchange resin. Chlorinated resin can also be used as the catalyst carrier of this invention and such chlorinated resin can be prepared according to the method described in Japanese Laid Open Patent Application No. 89312. In addition, such halogen containing resins as chlorinated polyethylene, vinyl chloride-vinyl acetate copolymer or brominated bisphenol type epoxy resin etc. can be used.

The amount of metal catalyst supported on the aforementioned halogen containing resin carrier is generally equal to between 0.1% to 10% by weight of the resin carrier. The method of supporting the metal catalyst on the resin carrier can be taken from the prior art. The amount of the catalyst used for producing hydrogen peroxide is above 1 g./l. of the reaction medium, and it can also be used in the form of a slurry.

Normally water can be used as the reaction medium in this invention, however, it is preferable to add a hydrogen peroxide stabilizer. Such prior art hydrogen peroxide stabilizers as inorganic acids, including phosphoric acid, sulfuric acid, and nitric acid, organic acids, including amino-trimethylenephosphonic acid, amino acids, including norleucine, salts of phosphoric acid, including sodium pyrophosphate, chelating agents, including EDTA, and surface active agents, including sodium alkylbenzene sulfonate, can be used. These stabilizers can be used in combination. As stabilizers, amino trimethylenephosphonic acid, 1-hydroxyethylidene-1,1- diphosphonic acid, ethylenediamine-tetramethylene- phosphonic acid, the sodium salts of these compounds, and sodium pyrophosphate are given as preferable examples. In concrete terms, the concentration of the stabilizer differs according to the type of stabilizer used and the concentration of hydrogen peroxide required, however, it is preferable that it be possible to maintain the stabilizer concentration at a low enough level to avoid corrosion of the catalyst or the reaction vessel structural materials. From the standpoint of pH, a range of pH 3 to pH 7 is desirable. Normally, the amount of stabilizer to be added is less than 0.1% by weight of the reaction medium and preferably below 100 ppm.

Either a fixed bed type reactor or a stirrer type reactor may be used in the present invention. In this invention, hydrogen peroxide is produced by the direct reaction of hydrogen and oxygen in the presence of the catalyst in the reaction medium, either in the presence or absence of a non-reactive gas such as nitrogen, under reaction conditions including a reaction pressure of 3 kg./cm$^2$·G to 150 kg./cm$^2$·G, a reaction temperature of 0° C. to 50° C. and a reaction time of thirty minutes to six hours depending upon the reactivity of the catalyst and reaction conditions.

EXAMPLES

Following is a further more concrete explanation of this invention by way of examples and comparative experiments. The analytical values of the gas composition used in the examples are gas chromatographic values. Moreover, the measurements of hydrogen peroxide concentrations in solution were made by titration with sulfuric acid - potassium permanganate solution.

EXAMPLE 1

Mitsubishi Kasei's aromatic modified adsorbing resin ("SP207": the trade name for a product of Mitsubishi Kasei Corporation, a brominated styrene-divinylbenzene copolymer, particle diameter 0.2 mm.–1 mm., specific surface area, 627 m²/g., true specific gravity 1.18, water content: 50.4% by weight) after being washed in methanol, 30% hydrogen peroxide, and water, was dried under vacuum. The resin was then swollen with chloroform and impregnated with a palladium acetate / chloroform solution. The chloroform was removed by evaporation and the resin was dried under vacuum. The palladium acetate impregnated into the resin was then reduced by hydrogen gas at 100° C. to palladium metal to obtain a palladium catalyst. After the reduction, the resulting catalyst was washed with methanol, sufficiently swelled and the micropores of the catalyst carrier were wetted. Then the catalyst was washed and suspended with a large amount of water to substitute the absorbed methanol with water, the resulting catalyst suspension was filtered, and a hydrophillic 1% by weight palladium catalyst which contained about 50% water by weight was obtained.

One hundred milliliters of an aqueous 12 ppm. phosphoric acid and 12 ppm. sodium pyrophosphate solution were placed in a 180 ml. volume glass vessel. Six grams of the above catalyst were added to this solution, and the glass vessel was then placed in an autoclave with a 300 ml. capacity. A gaseous mixture consisting by volume of 4% hydrogen gas, 16% oxygen gas and 80% nitrogen gas was added to the autoclave until a pressure of 25 kg./cm²-G was achieved and maintained. A temperature of 10° C. and stirring at 1000 rpm were maintained for 1 hour while introducing a flow of gas of the same composition at a rate of 0.8 l./min. through the autoclave. After stirring for one hour, the concentration of hydrogen peroxide in the reaction mixture was 0.58% by weight and the hydrogen selectivity was 70%. The hydrogen selectivity used here was calculated according to the following formula: hydrogen selectivity=((the amount of hydrogen peroxide produced in the reaction in moles) / (the amount of all hydrogen consumed calculated from the change in gas composition in moles))×100.

Additionally, the result of measurement by inductively coupled plasma emission spectroscopy using a SPS 1200 VR type spectrometer made by Seiko Instruments Inc. of the amount of palladium dissolved into the reaction medium from the catalyst after maintaining the reaction mixture containing the hydrogen peroxide under atmosphere for thirty minutes was 1 ppm.

COMPARATIVE EXPERIMENT 1

(COMPARISON WITH EXAMPLE 1)

Using Mitsubishi Kasei's aromatic adsorbing resin ("HP20": the trade name for a product of Mitsubishi Kasei Corporation, a non brominated styrene-divinylbenzene copolymer (standard product), grain size: 0.2 mm.-1 mm. diameter, specific surface area: 605 m²/g., true specific gravity: 1.01, water content: about 56.3% by weight) as the catalyst carrier and using the same catalyst preparation methods as in Example 1, a catalyst which was about 1% by weight palladium and which contained about 60% by weight of water was obtained. Upon reacting hydrogen and oxygen using this catalyst under the same reaction conditions as in Example 1, the concentration of the hydrogen peroxide produced in the reaction mixture was only 0.01% by weight and hydrogen selectivity was 0.5%.

COMPARATIVE EXPERIMENT 2

(COMPARISON WITH EXAMPLE 1)

Upon reacting hydrogen and oxygen under the same reaction conditions as in Comparative Experiment 1 except for the use of 100 ml. of a solution containing 0.1 mol./1. of sulfuric acid and 10 mmol./1. of sodium bromide in place of the phosphoric acid - sodium pyrophosphate solution as the reaction medium and using the same catalyst as in Comparative Experiment 1, the concentration of hydrogen peroxide produced in the reaction mixture was 0.50% by weight and the hydrogen selectivity was 73%. Additionally, upon measuring the amount of palladium dissolved into the reaction medium after maintaining the reaction mixture under atmosphere for 30 minutes in the same manner as in Example 1, the concentration of dissolved palladium was 15 ppm. Accordingly, in order to obtain essentially the same result using the prior art as in Example 1, the presence of bromine ion and a high concentration of acid in the reaction medium was necessary. This is the reason that the degree of dissolution of palladium from the catalyst into the reaction medium is very large in the prior art.

COMPARATIVE EXPERIMENT 3

(COMPARISON WITH EXAMPLE 1)

The 1% by weight palladium catalyst obtained in Example 1 was dried under vacuum, and a hydrophobic 1% by weight palladium catalyst was obtained (The water content was 0.1% by weight or less). Upon reacting hydrogen and oxygen using this catalyst under the same reaction conditions as in Example 1, the catalyst floated even after the reaction was stopped. The concentration of hydrogen peroxide produced in the reaction mixture was only 0.01% by weight and the hydrogen selectivity was 1%.

EXAMPLE 2

Mitsubishi Kasei's aromatic modified adsorbing resin ("SP206": the trade name for a product of Mitsubishi Kasei Corporation, a brominated styrene-divinylbenzene copolymer, grain size: 0.2 mm.-1 mm, specific surface area: 556 m²/g., true specific gravity: 1.19, water content: 50.0% by weight) after being washed in methanol, 30% hydrogen peroxide, and water, was impregnated with an aqueous chloroplatinic acid solution and dried under vacuum.

The resulting resin was reduced using hydrogen gas at 120° C. to obtain a platinum catalyst and the resulting catalyst was washed with methanol and then with water. A 0.5% by weight platinum catalyst which contained 50% by weight of water was obtained. Upon reacting hydrogen and oxygen using this catalyst under the same reaction conditions as in Example 1, the concentration of hydrogen peroxide produced in the reaction mixture was 0.20% by weight and the hydrogen selectivity was 30%.

COMPARATIVE EXPERIMENT 4

(COMPARED WITH EXAMPLE 2)

Mitsubishi Kasei's aromatic adsorbing resin ("HP20": the trade name for a product of Mitsubishi Kasei Corporation, a non brominated styrene-divinylbenzene copolymer (standard product)) was used as the catalyst carrier and a 0.5% by weight platinum catalyst which contained 60% by weight of water was obtained using the same catalyst preparation methods as in Example 2. Upon reacting hydrogen and oxygen using this catalyst under the same reaction conditions as in Example 2, the concentration of hydrogen peroxide produced in the reaction mixture was 0.00% by weight and the hydrogen selectivity was 0.0%.

EXAMPLE 3

Mitsubishi Kasei's heat resistant, strongly acidic and highly porous type ion exchange resin ("RCP145H": the trade name for a product of Mitsubishi Kasei Corporation, a brominated product of sulfonated styrene-divinylbenzene copolymer, grain size: 0.2 mm.–1 mm., H type, ion exchange capacity: 0.8 meq./ml., water content: 65% by weight), was used as the carrier and was impregnated with an aqueous solution of tetra-amine palladium (II) chloride, and after washing the impregnated resin with water, the resulting resin was reduced with an alkaline solution of formalin to obtain a palladium catalyst. The catalyst was washed with water and then with acid which returned the catalyst carrier resin to an H type exchange function. Then, the catalyst was washed with water until it was neutral and a 5% by weight palladium catalyst which contained 65% by weight of water was obtained. Upon reacting hydrogen and oxygen using this catalyst under the same reaction conditions as in Example 1, except that the amount of catalyst used was 5.7 grams, the concentration of hydrogen peroxide produced in the reaction mixture was 0.62% by weight and the hydrogen selectivity was 71%.

COMPARATIVE EXPERIMENT 5
(COMPARISON WITH EXAMPLE 3)

Mitsubishi Kasei's strongly acid, highly porous type ion exchange resin ("RCP12H": the trade name of a product of Mitsubishi Kasei Corporation, a non-brominated product of sulfonated styrene-divinylbenzene copolymer (standard product), grain size: 0.2 mm.–1 mm, H type, ion exchange capacity: 0.8 meq./ml., water content: 65% by weight) was used as the carrier, and under the same catalyst preparation conditions as in Example 3, a 5% by weight palladium catalyst which contained 65% by weight of water was obtained. Upon reacting hydrogen and oxygen using this catalyst under the same reaction conditions as in Example 3, the concentration of hydrogen peroxide produced in the reaction mixture was 0.02% by weight and the hydrogen selectivity was 1%.

EXAMPLE 4

Chlorinated polyethylene manufactured by Scientific Polymer Products Company (chlorine content: 48% by weight) was swelled and dissolved with chloroform, and after dissolution, a palladium acetate / chloroform solution in which the weight of the palladium was equal to 10% of the weight of the resin was added, the solvent was evaporated and the resin residue was dried under vacuum. The resulting resin was frozen by liquified nitrogen, ground to a powder and was then reduced by gaseous hydrogen at 60° C. to obtain a palladium catalyst. After washing the catalyst with methanol and then with water, a 10% by weight palladium catalyst was obtained.

One hundred milliliters of an aqueous 6 ppm. phosphoric acid and 6 ppm. sodium pyrophosphate solution was added to a 180 ml. glass vessel. To this solution was added 1 g. of the aforementioned catalyst and the glass vessel was placed in a 300 ml. capacity autoclave. A gas consisting of a mixture with a composition by volume of 4% hydrogen gas, 40% oxygen gas, and 56% nitrogen gas was added to the autoclave to achieve a pressure of 25 kg/cm$^2$.G. Subsequently, while a mixture of gas having the same composition was made to flow through the autoclave at a rate of 0.5 l./min., the temperature was maintained at 10° C. and the reaction mixture was stirred at a rate of 1000 rpm. for one hour. Upon stopping the stirring after one hour, the concentration of the hydrogen peroxide produced in the reaction mixture was 0.12% by weight and the hydrogen selectivity was 20%.

EXAMPLE 5

After swelling vinyl chloride-vinyl acetate copolymer resin manufactured by Scientific Polymer Products Company (vinyl chloride 86% by weight, vinyl acetate 13% by weight) with acetone, a palladium acetate / acetone solution, in which the weight of the palladium was equal to 5% of the weight of the resin, was added, the acetone was evaporated and the resulting resin was dried under vacuum. After the resulting resin was frozen with liquified nitrogen and ground it to a powder, it was reduced by hydrogen gas at 80° C. to obtain a palladium catalyst. The resulting catalyst was washed with methanol and then with water and a 5% by weight palladium catalyst was obtained. Upon reacting hydrogen and oxygen using this catalyst under the same reaction conditions as in Example 4, the concentration of the hydrogen peroxide produced in the reaction mixture was 0.15% by weight and the hydrogen selectivity was 28%.

EXAMPLE 6

To a methyl ethyl ketone solution of brominated bisphenol type epoxy resin manufactured by Dai Nippon Inki Kagaku Corporation (bromine content: 40% by weight) was added an acetone solution of trimellitic acid (manufactured by Mitsubishi Gas Chemical Company) where the amount of the trimellitic acid was equal to 18% of the weight of the epoxy resin and a palladium acetate / acetone solution where the weight of the palladium was equal to 5% of the weight of the epoxy resin, and the mixture was thermally polymerized at 200° C. The organic solvents were removed by evaporation during polymerization. After the resin obtained was frozen with liquified nitrogen and ground to a powder, the resulting resin was reduced at 140° C. with hydrogen gas to obtain a palladium catalyst. After washing the resulting catalyst with methanol and then with water, a 5% by weight palladium catalyst was obtained. Upon reacting hydrogen and oxygen using this catalyst under the same reaction conditions as in Example 4, the concentration of hydrogen peroxide produced in the reaction mixture was 0.10% by weight and the hydrogen selectivity was 25%.

COMPARATIVE EXPERIMENT 6

After dissolving polystyrene manufactured by Mitsubishi Monsanto Company in chloroform, a palladium acetate / chloroform solution was added sufficient to bring the amount of palladium present up to 5% by weight of the amount of the resin, and this mixture was dried under vacuum. The resulting resin was then reduced by hydrogen gas at 60° C. to obtain a palladium catalyst. The resulting catalyst was then frozen with liquified nitrogen, ground to a powder and washed with methanol and then water and a 5% by weight palladium catalyst was obtained. Upon reacting hydrogen and oxygen using this catalyst under the same reaction conditions as in Example 4, the concentration of hydrogen peroxide produced in the reaction mixture was 0.01% by weight and the hydrogen selectivity was 1%.

COMPARATIVE EXPERIMENT 7
(COMPARISON WITH EXAMPLE 6)

To a methyl ethyl ketone solution of bisphenol type epoxy resin manufactured by Dai Nippon Inki Kagaku Corporation was added an acetone solution of trimellitic acid in which the amount of the trimellitic acid (manufactured by Mitsubishi Gas Chemical Company) was equal to 18% of the weight of the epoxy resin and a palladium acetate / acetone solution in which the amount of palladium was equal to 5% of the weight of the epoxy resin. This mixture was thermally polymerized at 200° C. The organic solvents were removed by evaporation during polymerization. After the resulting mass was frozen by liquified nitrogen and ground to a powder, the resulting powder was reduced by hydrogen gas at 140° C. to obtain a palladium catalyst. The catalyst was washed with methanol and then water and a 5% by weight palladium catalyst was obtained. Upon reacting hydrogen and oxygen using this catalyst under the same reaction conditions as in Example 4, the concentration of the hydrogen peroxide produced in the reaction mixture was 0.00% by weight and the hydrogen selectivity was 0%.

EXAMPLE 7

Upon reacting hydrogen and oxygen using the same catalyst as in Example 1 and under the same reaction conditions as in Example 1 except for the use of a solution containing 75 ppm ethylenediamine-tetramethylene-phosphonic acid in place of the phosphoric acid - sodium pyrophosphate solution as the reaction medium, the concentration of hydrogen peroxide produced in the reaction mixture was 0.56% by weight and the hydrogen selectivity was 82%.

EXAMPLE 8

Polychlorotrifluoroethylene resin (chlorine content: 30.4% by weight) manufactured by Daikin Kogyo Company, Ltd. was frozen with liquified nitrogen and ground to a powder. To the powdered resin was added a palladium acetate / acetone solution where the weight of the palladium was equal to 1% of the weight of the resin. After the resin powder was impregnated with the aforementioned palladium acetate / acetone solution, the acetone was removed by evaporation. The resulting resin powder was dried under vacuum and reduced by hydrogen gas at 70° C. to obtain a palladium catalyst. The catalyst thus obtained was washed with methanol and then water and a 1% by weight palladium catalyst was obtained. Upon reacting hydrogen and oxygen using this catalyst under the same reaction conditions as in Example 4, the concentration of hydrogen peroxide produced in the reaction mixture was 0.11% by weight, and the hydrogen selectivity was 18%.

COMPARATIVE EXPERIMENT 8
(COMPARISON WITH EXAMPLE 8)

Polytetrafluoroethylene resin manufactured by Mitsui Du Pont Fluoro Chem. K.K. was used as the catalyst carrier, and, using the same catalyst preparation method as in Example 8, a 1% by weight palladium catalyst was obtained. Upon reacting hydrogen and oxygen using this catalyst under the same reaction conditions as in Example 4, the concentration of hydrogen peroxide produced in the reaction mixture was 0.01% by weight and the hydrogen selectivity was 1%.

EXAMPLE 9

Upon reacting hydrogen and oxygen using the same catalyst as in Example 1 and under the same reaction conditions as in Example 1 except that water was used as the reaction medium in place of the sodium pyrophosphate - phosphoric acid solution, the concentration of hydrogen peroxide produced in the reaction mixture was 0.52% by weight and the hydrogen selectivity was 65%.

EFFECTS OF THE INVENTION

In the Examples of this Invention, the hydrogen selectivity in the hydrogen peroxide production reactions was very high compared with the comparative experiments, and in the cases where halogen containing resins were used as catalyst carriers, it was possible to obtain hydrogen peroxide in high concentrations from solutions where there were no high acid concentrations or halogen ion in the reaction medium as there are in previous methods. Since there is no necessity of introducing high concentrations of acid or halogen ion as there is with previous methods, the use of the hydrogen peroxide production method of this invention renders the problems of damage due to the dissolution of the catalyst or of the corrosion of the material of the reaction vessel insignificant and makes possible the efficient production of a high concentration of hydrogen peroxide.

What we claim is:

1. A method for producing hydrogen peroxide which comprises reacting oxygen and hydrogen in a reaction medium in the presence of a platinum group metal catalyst supported on a halogenated resin, which halogenated resin excludes, however, resin containing no halogen other than fluorine.

2. A method for producing hydrogen peroxide according to claim 1, wherein said halogenated resin is a halogenated adsorbing resin or a halogenated ion exchange resin.

3. A method for producing hydrogen peroxide according to claim 2 wherein said halogenated adsorbing resin is a brominated styrene-divinylbenzene copolymer.

4. A method for producing hydrogen peroxide according to claim 2 wherein said halogenated ion exchange resin is a brominated styrene-divinylbenzene copolymer having sulfonic acid functional groups.

5. A method for producing hydrogen peroxide according to claim 1 wherein said platinum group metal catalyst is palladium or platinum.

6. A method for producing hydrogen peroxide according to claim 1 wherein the amount of said platinum group metal catalyst supported is 0.1% to 10% by weight.

7. A method for producing hydrogen peroxide according to claim 1 wherein said reaction medium is water.

8. A method for producing hydrogen peroxide according to claim 1 wherein said reaction medium is an aqueous solution containing a hydrogen peroxide stabilizer.

9. A method for producing hydrogen peroxide according to claim 1 wherein said reaction medium is an aqueous solution containing at least one member selected from the group consisting of amino tri-methylenephosphonic acid, 1-hydroxyethylidene-1,1-diphosphonic acid, ethylene diamine tetra-methylenephosphonic acid and the sodium salts of these compounds and sodium pyrophosphate.

10. A method for producing hydrogen peroxide according to claim 1 wherein said reaction medium is an aqueous solution containing phosphoric acid and sodium pyrophosphate.

11. A method for producing hydrogen peroxide according to claim 1 wherein hydrogen and oxygen are reacted directly in the reaction medium at a reaction temperature of between 0° C. and 50° C. and at a pressure of from 3 kg./cm$^2$·G to 150 kg./cm$^2$·G in the presence of said platinum group metal catalyst supported on said halogenated resin.

* * * * *